United States Patent [19]

Mullaney

[11] 4,389,051

[45] Jun. 21, 1983

[54] PRESSED IN ANTI-ROTATION LUGS FOR MECHANICAL FACE SEALS

[75] Inventor: John J. Mullaney, Warwick, R.I.

[73] Assignee: EG&G Sealol, Inc., Warwick, R.I.

[21] Appl. No.: 398,359

[22] Filed: Jul. 15, 1982

[51] Int. Cl.³ .............................................. F16J 15/34
[52] U.S. Cl. .................................. 277/41; 277/81 R; 277/93 SD
[58] Field of Search .................................. 277/38–41, 277/81 R, 93 R, 93 SD

[56] References Cited

U.S. PATENT DOCUMENTS

| | | |
|---|---|---|
| 2,479,968 | 8/1949 | Schick . |
| 2,561,132 | 7/1951 | Payne . |
| 2,593,899 | 4/1952 | Krug . |
| 2,856,219 | 10/1958 | Kosatka . |
| 2,889,159 | 6/1959 | Jensen . |
| 2,966,374 | 12/1960 | Jensen . |
| 3,094,336 | 6/1963 | Geary ............................ 277/93 X |
| 3,222,077 | 12/1965 | Snabes . |
| 3,239,232 | 3/1966 | Andresen ............................ 277/38 |
| 3,245,692 | 4/1966 | Voitik ............................ 277/40 |
| 3,561,775 | 2/1971 | Sturlason . |
| 3,578,344 | 5/1971 | Yost . |
| 3,588,128 | 6/1971 | Petersen . |
| 3,655,205 | 4/1972 | Petersen . |
| 3,706,459 | 12/1972 | Frenzel et al. . |
| 3,841,642 | 10/1974 | Kirker . |
| 3,941,394 | 3/1976 | Lukes . |

*Primary Examiner*—Robert S. Ward, Jr.
*Attorney, Agent, or Firm*—Finnegan, Henderson, Farabow, Garrett & Dunner

[57] ABSTRACT

A mechanical face seal which includes a non-rotatable seal ring and a rotatable mating ring biased into rubbing engagement. The non-rotatable seal ring is disposed in a stationary housing and is axially biased toward the rotatable mating ring which is fixed to a rotatable shaft. An anti-rotation member is pressed into the housing and is engageable with the non-rotatable seal ring to prevent its rotation while allowing axial movement thereof.

8 Claims, 5 Drawing Figures

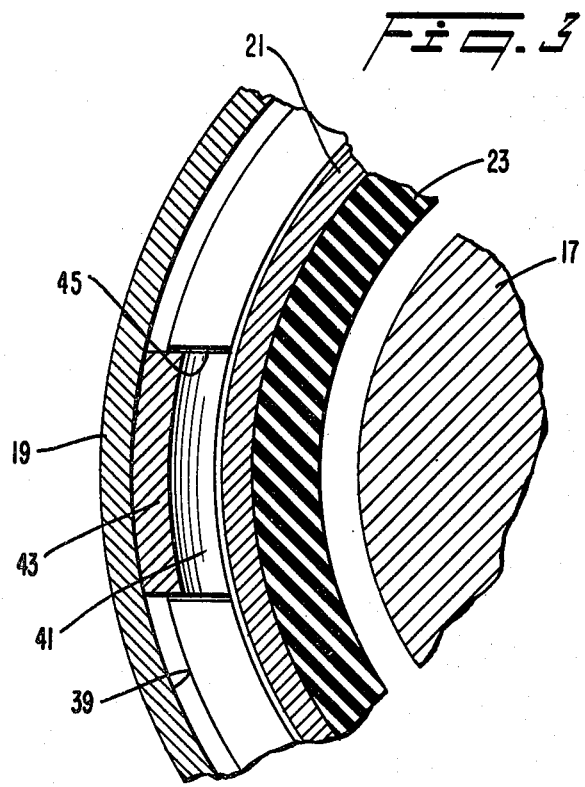
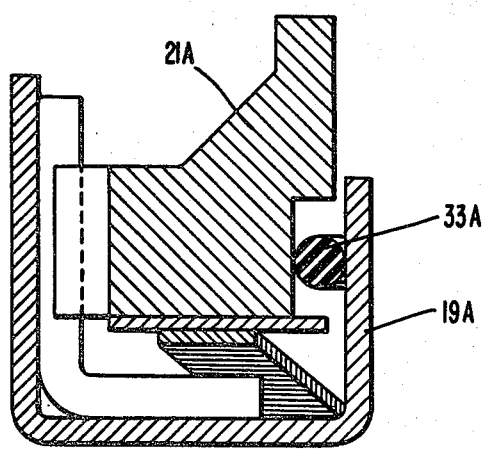
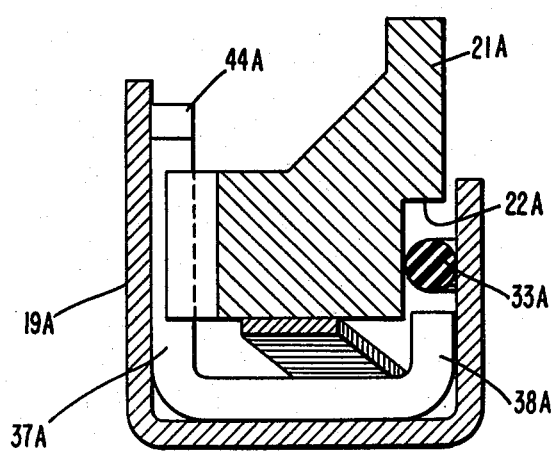

PRESSED IN ANTI-ROTATION LUGS FOR MECHANICAL FACE SEALS

BACKGROUND OF THE INVENTION

The present invention relates to mechanical face seals, and more particularly to a mechanical face seal which includes an improved member to prevent rotation of the non-rotating component thereof.

Mechanical face seals are used to seal an opening in the wall of a pressurized container through which a rotatable shaft extends. Many of these seal assemblies include a seal ring non-rotatably carried by a housing fixed to the container and a mating ring fixed to the shaft. The seal ring and mating ring are biased into rubbing engagement along confronting radial faces to maintain a pressure seal between the shaft and container wall.

In many of the above-described mechanical face seals, the seal housing which is fixed to the container at the opening is provided with lugs or pins which form anti-rotation abutments serving to prevent rotation of the seal ring with the mating ring on the shaft. In addition to serving as an anti-rotation means, these lugs or pins allow axial movement of the seal ring which is necessary to maintain sealing engagement with the mating ring. When lugs are used, they are welded in place in the housing. Pins are pressed into openings in the housing. It will be appreciated that the welded lugs and pressed pins can come loose and, if so, can destroy not only the seal itself but also the surrounding hardware. Furthermore, the welded lugs and pressed pins cannot be replaced easily upon wear and usually the entire seal assembly must be scrapped.

SUMMARY OF THE INVENTION

The present invention overcomes the problems and disadvantages discussed above by providing a mechanical face seal having an anti-rotation member which makes the seal inexpensive, easy to install, and easy to replace when damaged or worn. Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the present invention relates to a seal assembly comprising a stationary housing adapted to be fixed to a container at an opening, the housing having an opening aligned with the container opening and adapted to receive a rotatable shaft, a seal ring supported by the housing, a mating ring fixed to the shaft and cooperably engaging the seal ring, means preventing relative rotation between the housing and seal ring and allowing axial movement therebetween including a ring disposed in the housing opening and formed with lug means which are elastically deformed by engagement with the surface of the housing forming the opening, whereby the ring is non-rotatably secured to the housing, abutment means on the seal ring engaging the lug means to prevent rotation of the seal ring relative to the housing, the engaged lug means and abutment means allowing axial movement of the seal ring relative to the housing.

Broadly, the ring includes an annular portion positioned in an opening in a housing surrounding the shaft and is provided with a plurality of lugs which extend generally axially of the shaft. The lugs are shaped and the ring is sized so that when the ring is inserted into the housing opening, the lugs are deformed by bending so that an interference or press fit is provided between the lugs and the housing opening preventing rotation of the ring relative to the housing. In addition, deformation of the lugs upon insertion of the ring into the housing is elastic so that the ring is tightly retained against rotation in the housing opening and yet can be removed and replaced when damaged or worn. Before insertion into the housing opening, the lugs of the ring can be plastically deformed by bending about axes extending substantially tangentially of the ring so that their free ends define an outer diameter which is larger in diameter than the housing opening. Then, when the ring is pressed into the housing opening, the lugs are caused to be reverse bent elastically so that they tightly engage the housing and securely retain the ring in place.

In another aspect, the present invention relates to a seal assembly comprising a stationary housing adapted to be fixed to a container at an opening, the housing having an opening aligned with the container opening and adapted to receive a rotatable shaft, a seal ring supported by the housing, a mating ring fixed to the shaft and cooperably engaging the seal ring, means preventing relative rotation between the housing and seal ring and allowing axial movement therebetween including a lug member disposed in the opening and formed with a plurality of lugs which extend generally axially of the shaft, abutment means on the seal ring engageable with the lugs, the lugs being bent by engagement with the surface of the housing forming the opening, whereby the lug member is secured to the housing and prevents rotation of the seal ring.

In still another aspect, the present invention relates to a seal assembly comprising a stationary housing adapted to be fixed relative to a container at an opening therein, the housing having an opening aligned with the container opening and adapted to receive a rotatable shaft, a seal ring supported by the housing, a mating ring fixed to the shaft and cooperably engaging the seal ring, means biasing the seal ring toward the mating ring, means preventing relative rotation between the housing and seal ring and allowing axial movement therebetween including a ring disposed in the opening and formed with lug means, abutment means on the seal ring engaging the lug means, the abutment means and the lug means preventing rotation of the seal ring relative to the ring but allowing axial movement of the seal ring under the force of the biasing means, the lug means being elastically deformed by engagement with the surface of the housing forming the opening, whereby the ring is non-rotatably secured to the housing and prevents rotation of the seal ring.

In yet another aspect, the present invention relates to a mechanical face seal assembly of the type which includes rotatable and non-rotatable seal members carried by a rotatable shaft and a non-rotatable housing, respectively, and in rubbing engagement for effecting a fluid pressure seal, and is directed to the improvement which comprises a lug ring adapted to be positioned in an opening in the housing surrounding the shaft, the lug ring having a plurality of lugs extending generally axially thereof, the ring being sized and the lugs being formed so that upon insertion of the ring into the opening, the lugs are elastically deformed causing the ring to be non-rotatably secured to the housing, the lugs forming abutment means for preventing rotation of the non-rotatable member, the lug ring being removable from the housing.

The accompanying drawings which are incorporated in and constitute a part of this specification, illustrate embodiments of the invention and, together with the description that follows, serve to explain the principles of the invention.

BRIEF DESCRIPTION OF THE DRAWINGS

FIG. 3 is a sectional view of a portion of FIG. 1 taken along the line 3—3 thereof;

FIG. 4 is a view similar to FIG. 1 and showing a modified seal assembly; and

FIG. 5 is a view similar to FIG. 4 showing a modified form of anti-rotation member.

DESCRIPTION OF THE PREFERRED EMBODIMENT

Reference will now be made in detail to the present preferred embodiments of the invention, examples of which are illustrated in the accompanying drawings.

Figure 1:
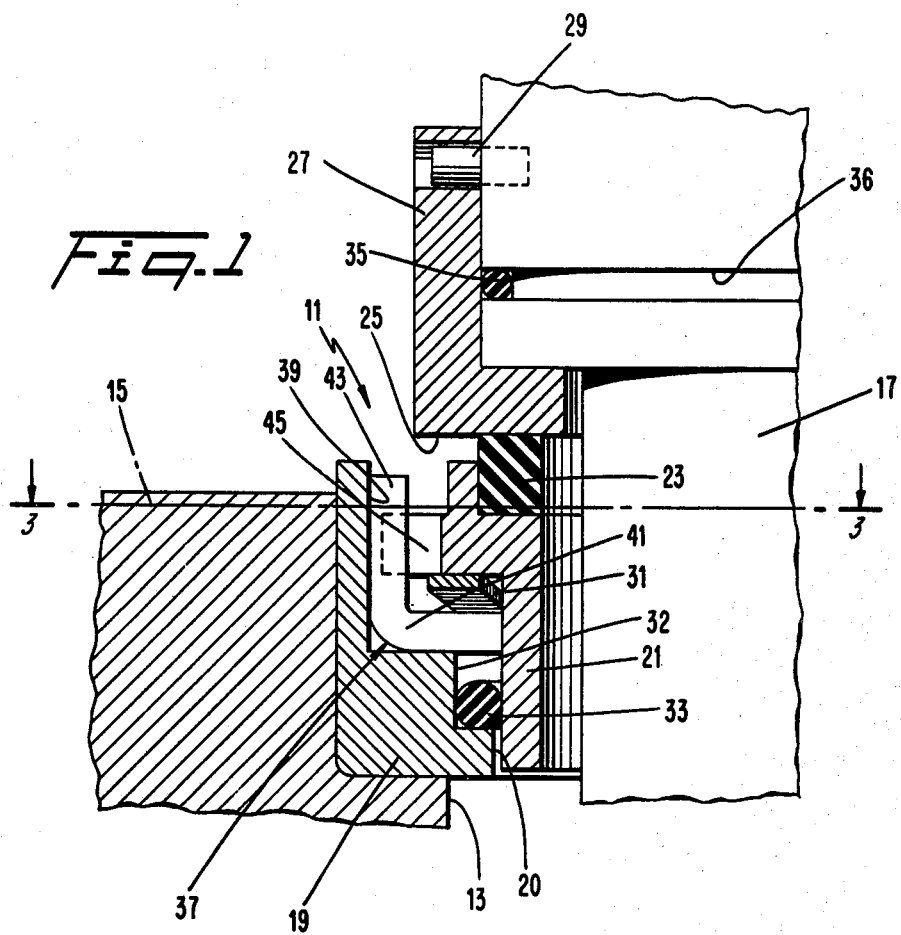
FIG. 1 is a sectional view showing a face seal assembly embodying a preferred form of the present invention.

The preferred embodiment of seal assembly of the present invention is illustrated generally at 11 in FIGS. 1 and 4 and is shown as providing a pressure seal between an opening 13 formed in a container 15, and a rotatable shaft 17. The container 15, only a portion of which is shown, can be, for example, a housing for a pump, compressor, gear box, or the like.

The seal assembly 11 includes a housing 19 which is fixed in the container opening 13 and defines an opening 20 through which the shaft 17 extends. A seal ring 21 is positioned within the housing opening 20 also in surrounding relationship to the shaft 17. The seal ring 21 includes an annular rubbing face member 23 which confronts and engages a radial face 25 formed on a mating ring 27. Suitable means such as dowel pins 29 secures the mating ring 27 to the shaft 17 for rotation therewith. A spring 31 axially biases the seal ring 21 into rubbing engagement with the mating ring 27 so that the seal ring 21 and mating ring 27 form a primary seal between the shaft 17 and the container 15 at the opening 20.

In addition, a secondary seal is provided by an O-ring 33 which is positioned in a counterbore 32 in the seal housing 19 and which engages the seal ring 21. Further, another O-ring 35 can be provided in an annular groove 36 in the shaft 17 to engage the inner circumferential surface of the mating ring 27 to form a secondary seal between the shaft 17 and the mating ring 27.

In accordance with the invention, means is provided for preventing relative rotation between the housing 19 and the seal ring 21 while allowing axial movement therebetween. As embodied herein, a lug member or ring 37 is disposed within a second counterbore 39 in housing 19. Ring 37 includes an annular portion 41 which is received in the opening 20 and is provided with a plurality of lugs 43 which extend generally axially of the ring 37 and of the shaft 17 (see FIG. 2). In the illustrated embodiment, the ring 37 is of one-piece, stamped sheet metal construction, and the lugs 43 are equally spaced around the periphery of the annular portion 41, there being four such lugs disposed at 90° intervals. It will be understood, however, that the number of lugs 43 can be varied so long as they achieve the inventive objects herein.

Figure 2:
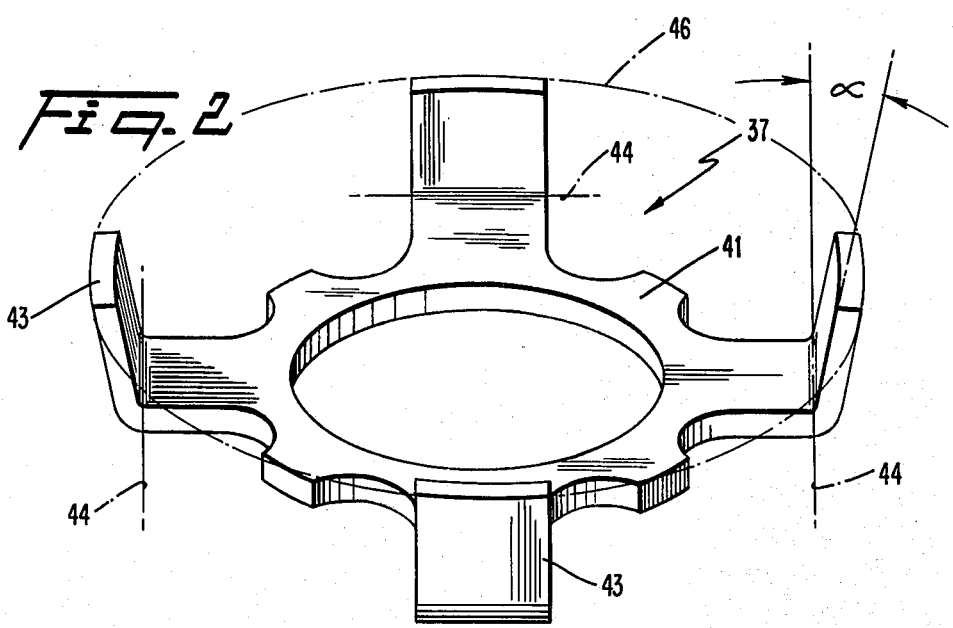
FIG. 2 is an enlarged perspective view showing the anti-rotation member of the present invention.

In accordance with the invention, the ring 37 is constructed of a material, and is sized with respect to counterbore 39 and the lugs 43 are shaped such that when the ring 37 is positioned in the counterbore 39, the lugs 43 are elastically deformed by engagement with the surface of counterbore 39. As embodied herein, during formation of the ring 37, the lugs 43 are either preformed or they are plastically deformed by bending them about axes 44 extending substantially tangentially of the ring 37 so that the free ends of the lugs 43 form an angle with a plane perpendicular to the annular portion 41 (see FIG. 2). As shown in FIG. 2, the free ends of the bent lugs 43 define an outer diameter 46 for the ring 37 which is larger than the diameter of the counterbore 39. Therefore, when the ring 37 is pressed into the counterbore 39, engagement between the surface of counterbore 20 and the lugs 43 causes the lugs to deform elastically by reverse bending about the axes 44. This causes the lugs 43 to grip the surface of the counterbore 39 thereby providing an interference or press fit which tightly and securely holds the ring 37 in position in housing 19. Since the lugs 43 are elastically deformed, they serve to hold the ring 37 securely in place in the counterbore 39 and yet allow the ring to be removed and replaced if necessary.

As further embodied herein, the seal ring 21 is formed with one or more radial projections 45 which, when the seal ring 21 is in position in the housing 19, are between the lugs 43 and are sized to rotatably abut one of the lugs 43 and not be able to pass them. The seal ring 21 therefore is prevented from rotating with the mating ring 27 during rotation of the shaft 17. As shown in FIG. 4, the circumferential dimension of the projections 45 is less than the spacing between adjacent lugs 43 so that seal ring 21 can move axially under the force of spring 31 to maintain sealing engagement between seal ring 21 and mating ring 27.

The present invention provides a mechanical face seal assembly which includes a pressed in member for preventing rotation of one of the seal members, which seal assembly is relatively low in cost and yet is reliable in performance. It will be appreciated that the ring 37 is an inexpensive member and is quickly and easily installed in place within the counterbore 39 in housing 19. The present invention eliminates the costly welding procedure of the previous "welded in place" lugs and the costly procedure required for the prior dowel pins. Furthermore, the ring 37 of the present invention can easily be removed and replaced should it wear in use.

In the modified seal shown in FIG. 4, the housing 19A is modified so that secondary O-ring seal 33A is formed between the housing and the inner periphery of the seal ring 21A.

In the modified embodiment of FIG. 5, the ring 37A has an inturned end 38A which cooperates with a shoulder 21, 22A on seal ring 21A to form a groove for the secondary O-ring seal 33A. In addition, the lugs 43 are provided with lateral extensions 44A which serve as a retainer for the seal ring 21A.

It will be apparent to those skilled in the art that various additions, substitutions, modifications and omissions can be made to the present invention without departing from the scope or spirit of the invention. Thus, it is intended that the present invention cover those additions, substitutions, modifications and omissions provided they come within the scope of the appended claims and their equivalents.

What is claimed is:

1. A seal assembly comprising a stationary housing adapted to be fixed to a container at an opening, said housing having an opening aligned with the container opening and adapted to receive a rotatable shaft, a seal ring supported by said housing, a mating ring fixed to said shaft and cooperably engaging said seal ring, means preventing relative rotation between said housing and seal ring and allowing axial movement therebetween including a ring disposed in said housing opening and formed with lug means which are elastically deformed by engagement with the surface of said housing forming said opening, whereby said ring is non-rotatably secured to said housing, abutment means on said seal ring engaging said lug means to prevent rotation of said seal ring relative to said housing, said engaged lug means and abutment means allowing axial movement of said seal ring relative to said housing.

2. A seal assembly comprising a stationary housing adapted to be fixed to a container at an opening, the housing having an opening aligned with the container opening and adapted to receive a rotatable shaft, a seal ring supported by said housing, a mating ring fixed to said shaft and cooperably engaging said seal ring, means preventing relative rotation between said housing and seal ring and allowing axial movement therebetween including a lug member disposed in said opening and formed with a plurality of lugs which extend generally axially of said shaft, abutment means on said seal ring engageable with said lugs, said lugs being bent by engagement with the surface of said housing forming said opening, whereby said lug member is secured to said housing and prevents rotation of said seal ring.

3. A seal assembly comprising a stationary housing adapted to be fixed relative to a container at an opening therein, the housing having an opening aligned with the container opening and adapted to receive a rotatable shaft, a seal ring supported by said housing, a mating ring fixed to said shaft and cooperably engaging said seal ring, means biasing said seal ring toward said mating ring, means preventing relative rotation between said housing and seal ring and allowing axial movement therebetween including a ring disposed in said opening and formed with lug means, abutment means on said seal ring engaging said lug means, said abutment means and said lug means preventing rotation of said seal ring relative to said ring but allowing axial movement of said seal ring under the force of said biasing means, said lug means being elastically deformed by engagement with the surface of said housing forming said opening, whereby said ring is non-rotatably secured to said housing and prevents rotation of said seal ring.

4. A seal assembly as claimed in claim 1, said ring being generally annular and said lugs extending generally axially thereof, said lugs being plastically deformed by bending about axes which extend generally tangentially of the ring, said ring being sized relative to said opening so that when positioned therein, said lugs are elastically reverse bent to non-rotatably retain said ring in said opening.

5. A seal assembly as claimed in claim 1, said ring and lugs being a one-piece member formed of stamped sheet metal.

6. A seal assembly as claimed in claim 4, said lugs being disposed uniformly around the periphery of said ring, the free ends of said lugs defining an outer diameter of said ring which is larger than the diameter of said housing opening, whereby said lugs are press fitted in said housing opening when said ring is inserted thereon.

7. A seal assembly as claimed in claim 2, said lugs being elastically deformed upon insertion of said ring into said opening and being removable therefrom.

8. In a mechanical face seal assembly of the type which includes rotatable and non-rotatable seal members carried by a rotatable shaft and a non-rotatable housing, respectively, and in rubbing engagement for effecting a fluid pressure seal, the improvement which comprises a lug ring adapted to be positioned in an opening in said housing surrounding said shaft, said lug ring having a plurality of lugs extending generally axially thereof, said ring being sized and said lugs being formed so that upon insertion of said ring into said opening, said lugs are deformed causing said ring to be non-rotatably secured to said housing, said lugs forming abutment means for preventing rotation of said non-rotatable member, said lug ring being removable from said housing.

* * * * *